March 27, 1945.   R. A. GOEPFRICH   2,372,322
BRAKE
Filed May 11, 1942    5 Sheets-Sheet 1

INVENTOR
RUDOLPH A. GOEPFRICH
BY
M. W. McConkey
ATTORNEY

March 27, 1945.  R. A. GOEPFRICH  2,372,322
BRAKE
Filed May 11, 1942  5 Sheets-Sheet 2

INVENTOR
RUDOLPH A. GOEPFRICH
BY
*M. W. McConkey*
ATTORNEY

March 27, 1945.　　　R. A. GOEPFRICH　　　2,372,322
BRAKE
Filed May 11, 1942　　　5 Sheets-Sheet 3

INVENTOR
RUDOLPH A. GOEPFRICH
BY M. W. McConkey
ATTORNEY

March 27, 1945. R. A. GOEPFRICH 2,372,322
BRAKE
Filed May 11, 1942 5 Sheets-Sheet 4

INVENTOR
RUDOLPH A. GOEPFRICH
BY
M. W. McConkey
ATTORNEY

March 27, 1945.    R. A. GOEPFRICH    2,372,322
BRAKE
Filed May 11, 1942    5 Sheets-Sheet 5

INVENTOR
RUDOLPH A. GOEPFRICH
BY
M. W. McConkey
ATTORNEY

Patented Mar. 27, 1945

2,372,322

UNITED STATES PATENT OFFICE 2,372,322

BRAKE

Rudolph A. Goepfrich, South Bend, Ind., assignor to Bendix Aviation Corporation, South Bend, Ind., a corporation of Delaware Application May 11, 1942, Serial No. 442,418

2 Claims. (Cl. 188—106)

This invention relates to brakes, and is illustrated as embodied in certain constructions of internal expanding drum brakes.

It is the chief object of my invention to furnish a brake which is at once extremely effective and easily controllable. To this end I utilize a pair of shiftable anchorage friction devices each adapted to anchor at one end or the other and each having two parts or shoes pivotally connected together by an adjusting strut. Thus, within each shiftable friction device, one of the parts of the shoes always exerts a servo effect on the other.

By using arcuate friction devices which are anchored and applied at their ends, but which are adjusted intermediate their ends to compensate for wear, I have simplified and overcome the adjustment problem. As brake friction devices wear they are usually adjusted by moving them radially toward the circumference of the drum. If the adjustment increases the distance between the friction devices and the actuators which operate the friction devices, the adjusting is not accomplishing its purpose. Where levers or other mechanical actuators are used to spread the friction devices (the levers themselves may be operated hydraulically or mechanically), the adjustment must, in effect, change the length of the friction device. This I provide for by breaking the friction devices into two parts or shoes which have arc lengthening adjusting means between them.

A further object of my invention is to apply a brake of the type generally described above with a single control, as for example, a single hydraulic motor cylinder.

The above and other objects and advantages of the invention, including various novel combinations of parts and desirable particular constructions, will be apparent from the following description of the illustrative embodiments shown in the accompanying drawings, in which.

Figure 7:
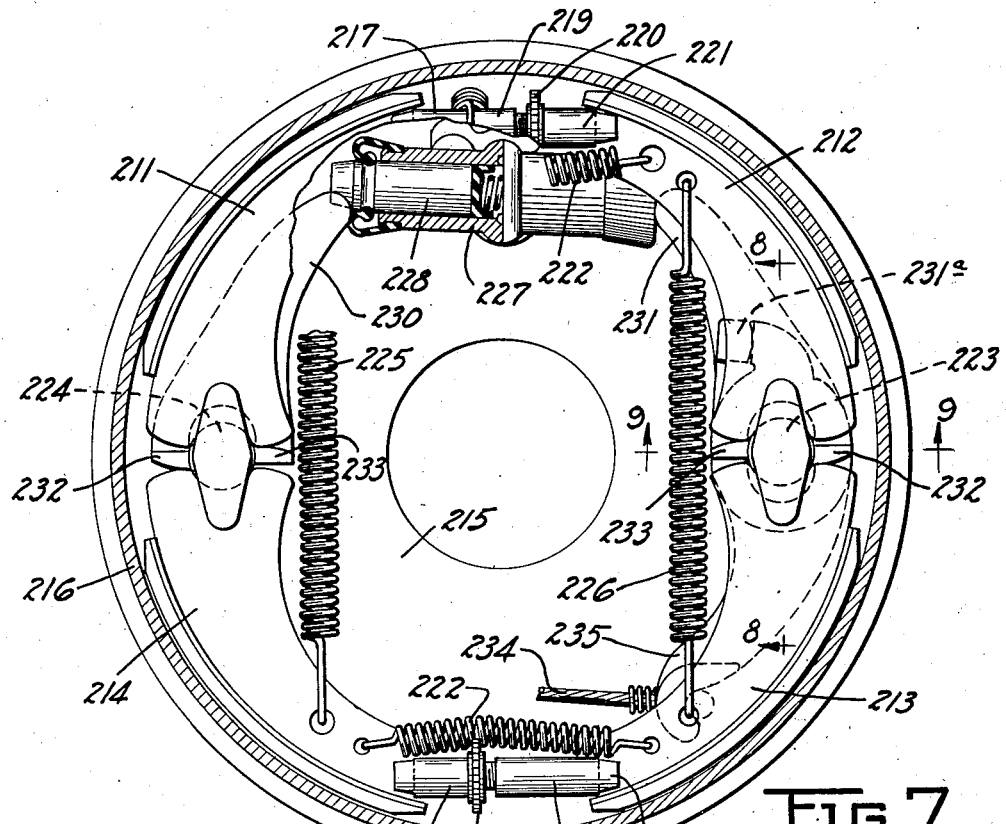
Figure 7 is a vertical section taken through a brake assembly on a plane just inside the head of a brake assembly showing a further modification of my invention.
Figures 8, 9:
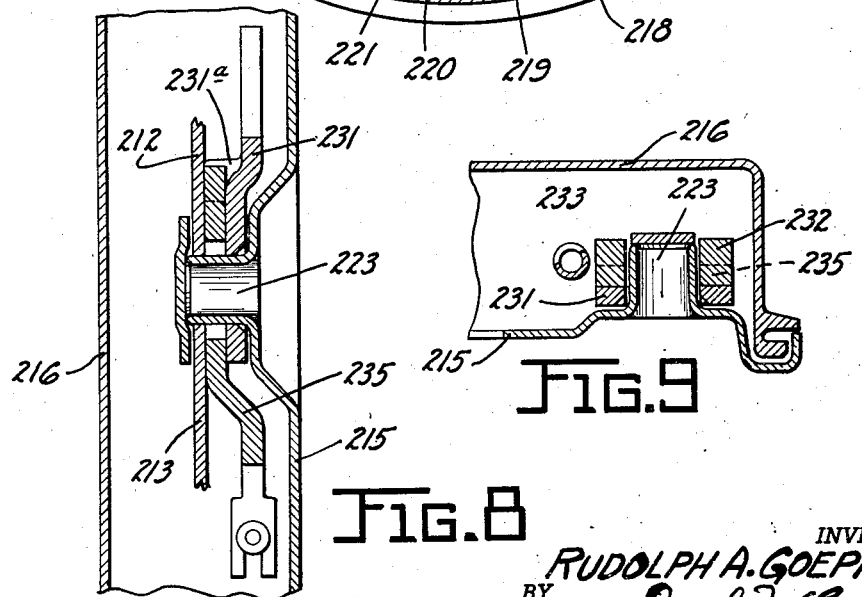
Figure 10:
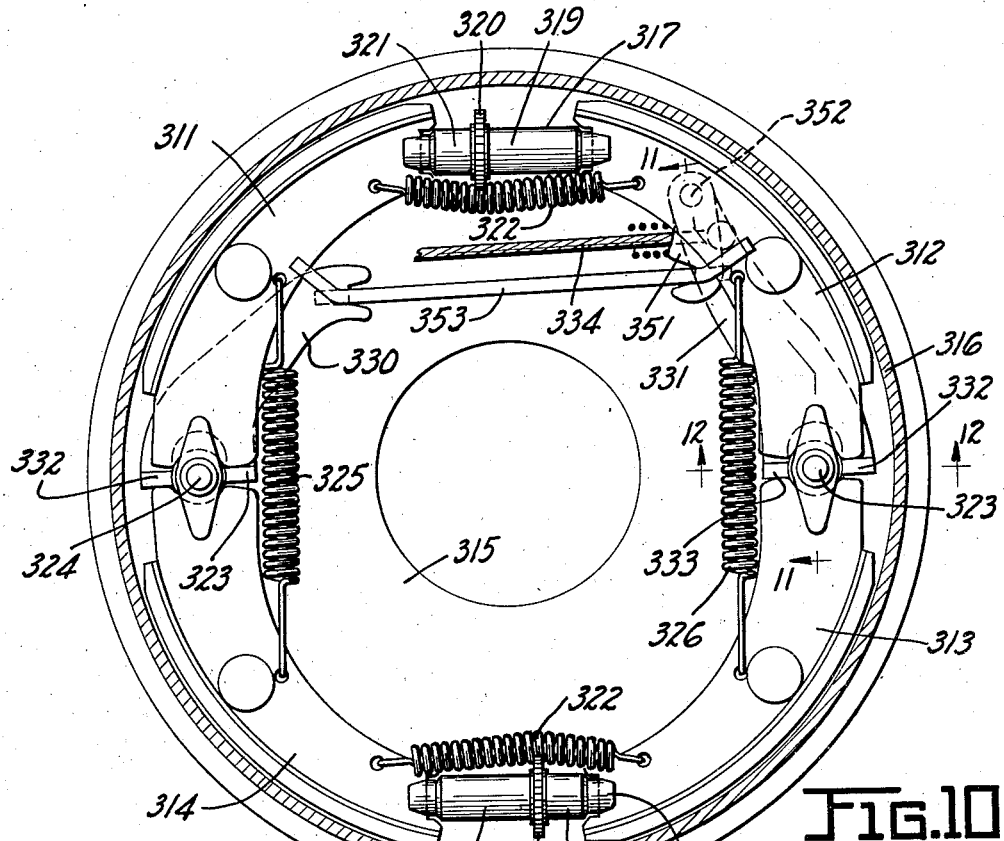
Figures 11, 12:
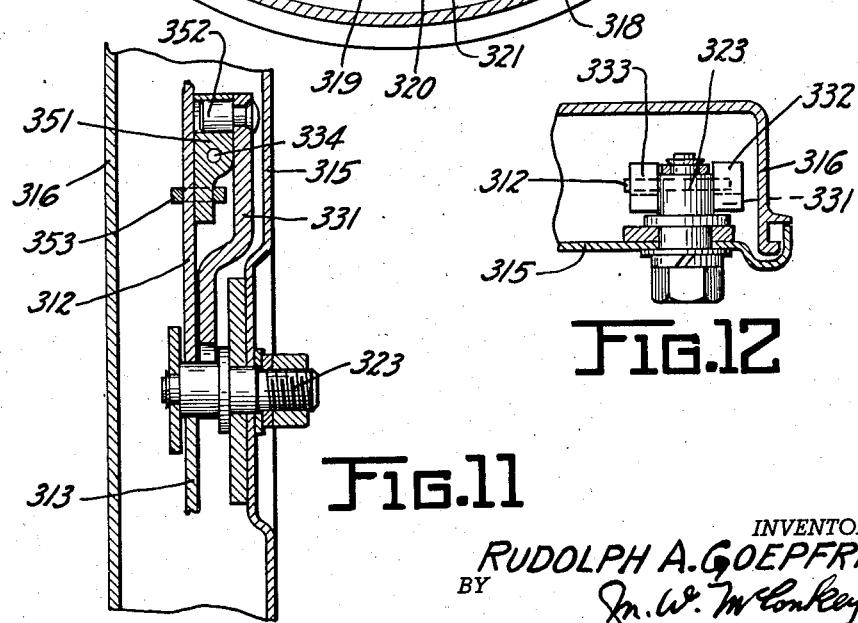
Figure 13:
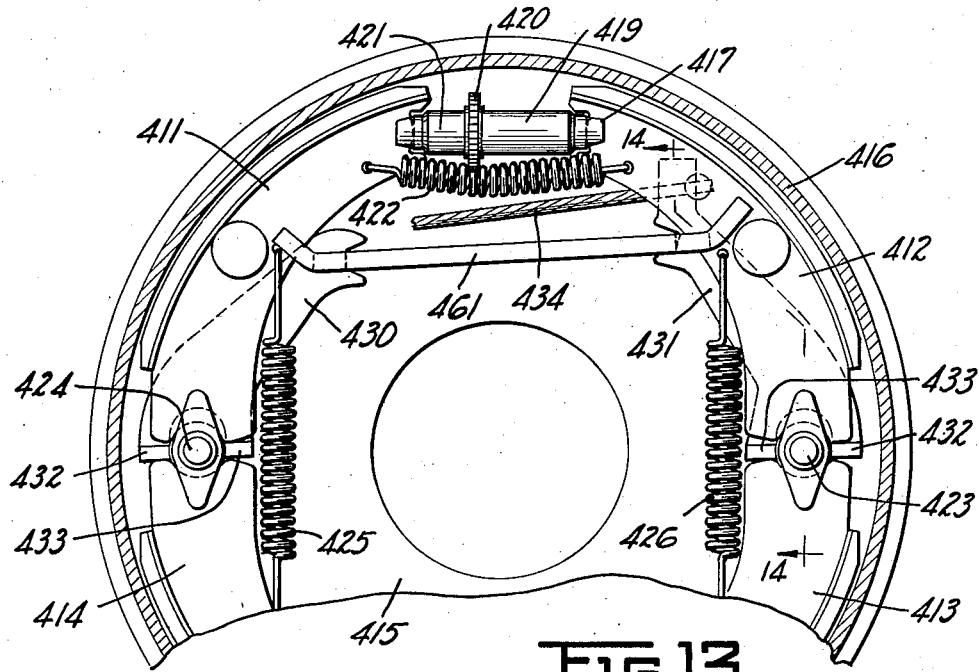
Figure 14:
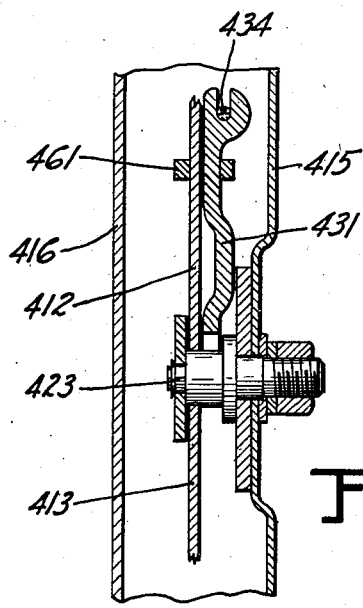

Figures 8 and 9 are figures taken on the lines 8—8 and 9—9 respectively of Figure 7;

Figure 10 is a vertical section taken through a brake assembly on a plane just inside the head of a brake assembly showing a further modification of my invention;

Figures 11 and 12 are figures taken on the lines 11—11 and 12—12, respectively, of Figure 10;

Figure 13 is a vertical section taken through a brake assembly on a plane just inside the head of a brake assembly showing a further modification of my invention; and Figure 14 is a section taken on the line 14—14 of Figure 13.

The several brake assemblies illustrated each utilizes four brake shoes. These are preferably made identical in construction so that they may be produced on a large scale or mass production basis. Thus a considerable saving in cost may be effected over a brake using varied sizes and designs of shoes.

Referring to the brake shown in Figures 1 to 4 inclusive, the assembly generally comprises four brake shoes 11, 12, 13 and 14, a support or backing plate 15 on which the shoes are mounted, a rotatable brake drum 16, and anchoring and applying means for the shoes. The shoes are divided into two pairs, the shoes of each pair being connected together by an adjusting strut, 11 and 12 by a strut 17, 13 and 14 by a strut 18. The struts 17 and 18 may each include a member 19 pivoted to and prevented from rotation relative to one of the shoes in its pair and providing an interior threaded surface; an adjacent screw 20 having a stem screwed into the member 19 and a serrated head adapted to be turned for adjusting purposes, and a member 21 supporting the head of screw 20 and pivoted to and prevented from rotation relative to the other shoe in its pair. Springs 22 may be connected between each pair of shoes to hold them against the adjusting strut and to prevent unwanted rotation of the serrated adjusting screw heads.

Each pair of shoes with its adjusting strut, i. e., 11, 12 and 17 as one unit and 13, 14 and 18 as the other, forms an individually shiftable friction device shiftable to anchor at one end or the other according to the direction of drum rotation when the friction devices contact the drum. Anchors 23 and 24 are provided between the ends of the shiftable friction devices to transmit the torque thereof to the support 15. Return springs 25 and 26 normally hold the friction devices away from the drum, the anchors 23 and 24 swing also as stops to determine the released position of the friction devices under the influence of the return springs.

A hydraulic motor 27, which may be positioned adjacent the center of one of the friction devices, is adapted to apply the shoes. The motor has, as is customary, opposed pistons 28 and 29 which, when moved apart exert equalized force of the ends of levers 30 and 31 respectively to swing the levers and simultaneously exert spreading force between the friction devices at both ends thereof and adjusting the anchors. Each lever applies force to the shoes through its projections 32 and 33 each of which pivots on the web of one of the friction devices. A mechanical auxiliary brake applying unit is provided comprising a tension member 34 and a lever 35 connected thereto and connected to or integral with lever 31.

In the various modifications, the changes are not of great consequence. Most of the parts are closely similar to certain parts already described in relation to the brake of Figures 1 to 4. Consequently the similar parts will not be in each case redescribed, but, for purposes of clarity, the parts of the modified brake shown in Figures 5 and 6 have been given the numerals of similar parts in Figures 1 to 4 100, the parts of the modified brake shown in Figures 7 to 9 have been given the numerals of similar parts in Figures 1 to 4 200, the parts of the modified brake shown in Figures 10 to 12 have been given the numerals of similar parts in Figures 1 to 4 300, and the parts of the modified brake shown in Figures 13 and 14 have been given the numerals of similar parts in Figures 1 to 4 400.

Figure 1:
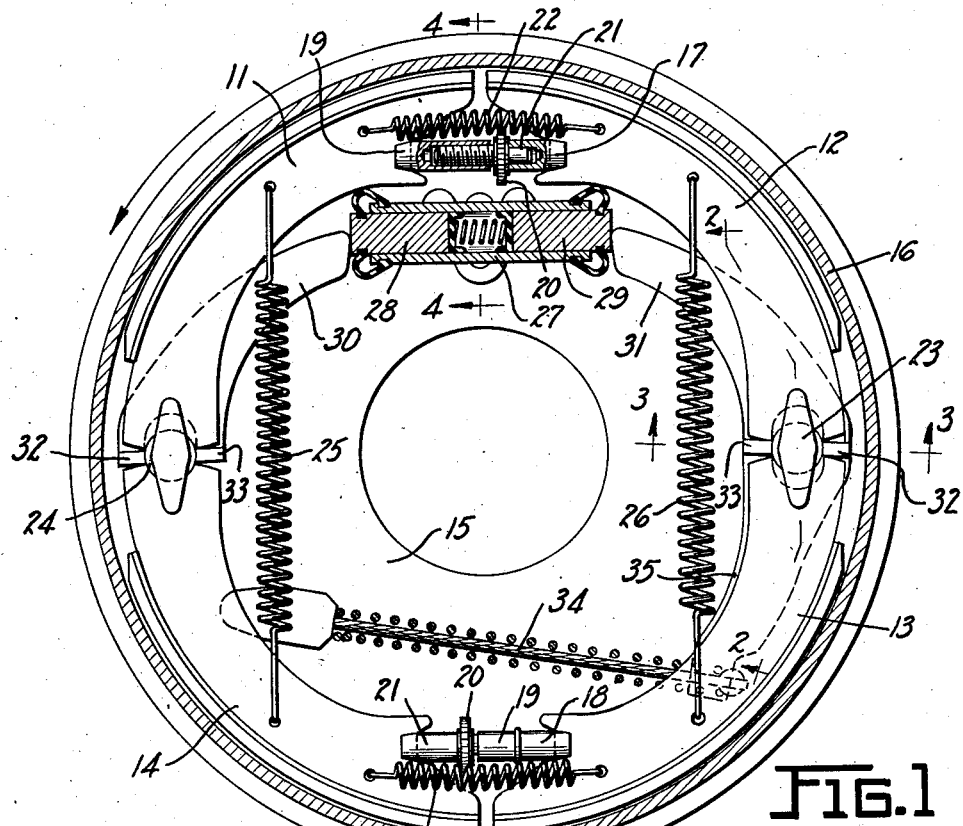
Figure 1 is a vertical section taken through a brake assembly on a plane just inside the head of a brake drum.
Figures 2, 3, 4:
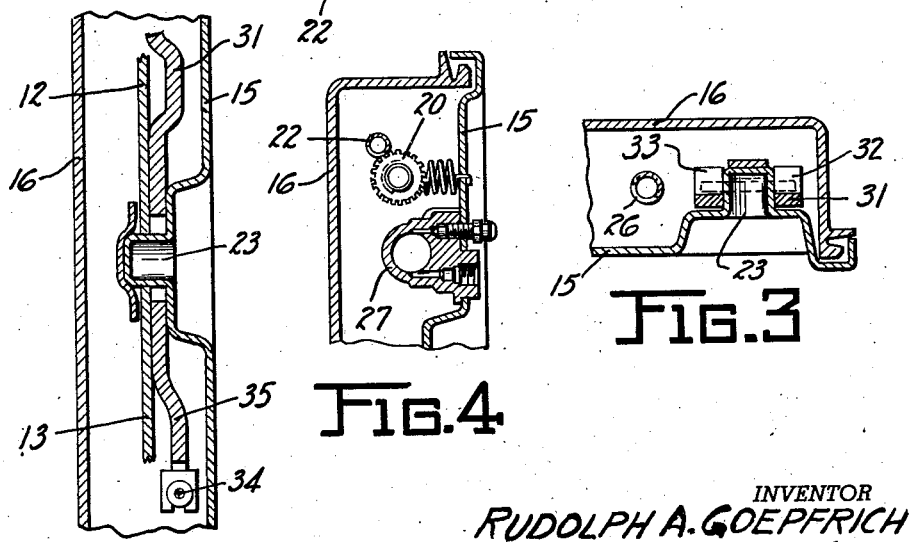
Figures 2, 3 and 4 are figures taken on the lines 2—2, 3—3, 4—4, respectively, of Figure 1.
Figure 5:
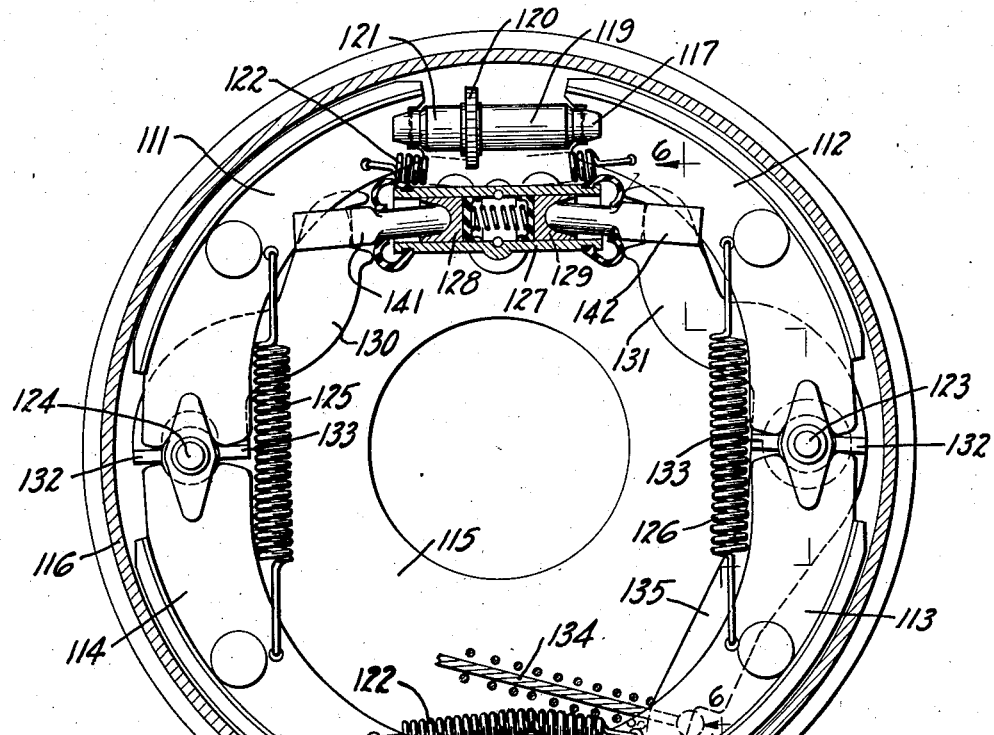
Figure 5 is a vertical section taken through a brake assembly on a plane just inside the head of a brake drum showing a modified form of my invention.
Figure 6:
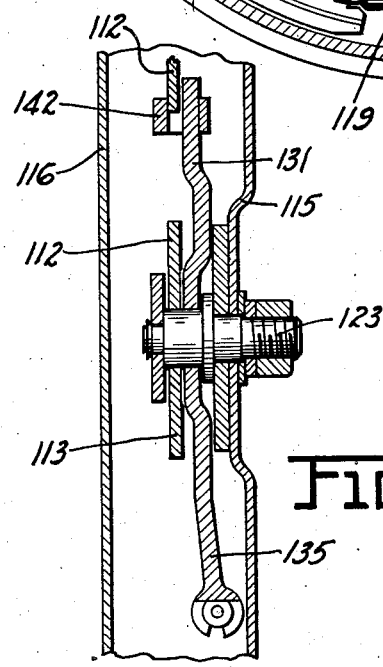
Figure 6 is a section taken on the line 6—6 of Figure 5.

In the modification shown in Figures 5 and 6, the pistons 128 and 129 apply force to the levers 130 and 131 through the intermediary of thrust links 141 and 142. Also there is some difference in the shape of the shoes and the applying levers, and in the positioning of the springs 122. In the modification of Figures 7 to 9 inclusive, the lever 235 is not directly connected to the lever 231. The lever 235 carries the projections 232 and 233, and the lever 231 has a projection 231a which contacts the upper end of lever 235 to exert a spreading force on the friction devices through the intermediary of the lever 235 and its projections. In the modification shown in Figures 10 to 12 inclusive, no hydraulic motor is used for applying purposes, but instead the levers 330 and 331 are actuated by a small equalized lever 351 which is connected at 352 to the lever 331 and is connected by a thrust link 353 to the lever 330. The lever 351 is arranged to be operated by a tension member 334. In the modification of Figures 13 and 14, the tension member 434 exerts force on the levers 430 and 431 by means of a direct connection with lever 431, which in turn is connected by a thrust link 461 with lever 431.

In the operation of all of the modifications shown, spreading force applied at the end of the friction devices tends to move both of the friction devices against the brake drum, and each of the devices anchors at one end or the other according to the direction of drum rotation. For example, in Figure 1, force applied by the motor 27 tends to twist the lever 30 in a counterclockwise direction and lever 31 in a clockwise direction. Such twisting of the levers exerts an applying force at both ends of both friction devices through the intermediary of the projections 32 and 33. Once the friction devices have been moved into contact with the drum, friction with the drum will anchor them individually. The friction device which comprises shoes 11 and 12, if the direction of rotation is as shown by the arrow, will anchor at 24, while the friction device comprising shoes 13 and 14 will anchor at 23. If the direction of the rotation of the drum is opposite that shown by the arrow, the friction device comprising shoes 11 and 12 will anchor at 23 and the friction device comprising shoes 13 and 14 will anchor at 24. Each of the friction devices is of itself a servo applying device, in the sense that, regardless of the direction of drum rotation, one of the shoes comprising the friction device anchors and the other shoe exerts an applying force through the intermediate strut on the anchoring shoe. Thus if the direction of rotation is that shown by the arrow, shoe 12 will act as a servo shoe in exerting an applying force through adjusting strut 17 on shoe 11 which will anchor at 24. Likewise shoe 14 will act as a servo shoe to exert applying force through adjusting strut 18 on anchored shoe 13. If the direction of drum rotation is opposite that indicated by the arrow, shoes 12 and 14 will anchor, and shoes 11 and 13 will act as their respective servo applying shoes.

It will be apparent from the above description that I have provided a brake which comprises the exceptional qualities of effectiveness with adequate controllability. The effectiveness is there because of the servo and self-energizing action of the various shoes. The controllability is present because I have used two individually shiftable friction devices which do not build up servo effect around the full circumference of the brake drum and which, because they are disconnected, do not transmit any applying difficulties which they may occasionally have to one another.

Being aware of the possibilities of modifications in the particular structures herein described without departing from the fundamental principles of my invention, I do not intend that their scope be limited except as set forth by the appended claims.

I claim:

1. A brake comprising a rotatable brake drum, a non-rotatable support, a pair of shiftable anchorage friction devices each adapted to anchor at one end or the other according to the direction of drum rotation at the time they contact the drum and each including two parts and an adjusting strut connecting the parts together to form an adjustable length two-way servo device, a pair of anchors one at each side of the support between the friction devices, applying means comprising a pair of floating applying levers each straddling one of the anchors and each acting on the ends of the friction devices adjacent thereto, a hydraulic motor mounted on the support near the center of one of the friction devices having pistons therein adapted to spread the ends of the levers to simultaneously exert a force at both ends of both friction devices tending to move them against the drum, an extension of one of said levers, and a cable connected to said extension to actuate said lever mechanically, thereby moving one end of each friction device against the drum while the other end of each friction device anchors at the opposite side of the brake, the lever having the extension being moved away from the hydraulic motor when the cable is actuated.

2. A brake comprising a rotatable brake drum, a non-rotatable support, a pair of shiftable anchorage friction devices each adapted to anchor at one end or the other according to the direction of drum rotation at the time they contact the drum and each including two parts and an adjusting strut connecting the parts together to form an adjustable length two-way servo device, a pair of anchors one at each side of the support between the friction devices, applying means comprising a pair of floating applying levers each acting on the adjacent ends of the friction devices at one side of the brake, a hydraulic motor mounted on the support near the center of one of the friction devices having pistons therein adapted to spread the ends of the levers to simultaneously exert a force at both ends of both friction devices tending to move them against the drum, an extension on one of said levers, and a cable connected to said extension to actuate said lever mechanically, thereby moving one end of each friction device against the drum while the other end of each friction device anchors at the opposite side of the brake, the lever having the extension being moved away from the hydraulic motor when the cable is actuated.

RUDOLPH A. GOEPFRICH.